United States Patent [19]

Hasebe

[11] 4,104,460

[45] Aug. 1, 1978

[54] METHOD FOR TREATING SEAWEED WITH HYDROGEN PEROXIDE OR HYDROGEN PEROXIDE COMPOUND

[76] Inventor: Nobuyasu Hasebe, No. 24-8, 2-chome, Nishiogikita, Suginami-ku, Tokyo, Japan

[21] Appl. No.: 723,172

[22] Filed: Sep. 14, 1976

[51] Int. Cl.² ............................................. C08B 37/04
[52] U.S. Cl. .......................................... 536/3; 195/4; 195/7; 204/160.1
[58] Field of Search ..................... 536/3; 204/160.1; 195/7, 4

[56] References Cited

U.S. PATENT DOCUMENTS 2,128,551   8/1938   LeGloahec et al. .................... 536/3

OTHER PUBLICATIONS

Tobolsky and Mesrobian, Organic Peroxides, pp. VII, 2, 3, 33 and 34, Interscience Publ., NY., 1954.

*Primary Examiner*—Melvyn I. Marquis
*Attorney, Agent, or Firm*—Haseltine, Lake & Waters

[57] ABSTRACT

A method is disclosed for stripping off the outer skin of seaweed with hydrogen peroxide or a hydroperoxide compound, which is suitable for use in preparing seaweed powder or algin from the seaweed.

12 Claims, No Drawings

METHOD FOR TREATING SEAWEED WITH HYDROGEN PEROXIDE OR HYDROGEN PEROXIDE COMPOUND

BACKGROUND OF THE INVENTION

This invention relates to a method for treating seaweed, more specifically to a method for stripping off the outer skin (exodermis) of the seaweed for preparing seaweed-powder or algin.

Although various seaweeds, such a Laminaria or Undaria pinnatifida, have provided sources of useful alkali foods for human consumption since ancient time, in their natural forms these plants themselves are not necessarily suitable as foods. For example, seaweed products commonly marketed are prepared by simply drying the natural seaweed. As these products have the seaweed skin intact, they have a bad appearance, being dull in tone and giving the impression of being unclean. Furthermore, they are difficult to digest. Seaweeds are also boiled to produce soup base and stock concentrates. However, naturally available seaweed is disadvantageous in producing such concentrates since the skins thereof impair the quality as well as digestibility of the soups and stocks prepared from the concentrates.

Another applications of seaweed is the preparation of algin therefrom.

Alginic acid, a kind of mannuronan belonging to the polyuronide family, is a linear molecule composed of D-mannuroic acid having $\beta$-1,4 bonds therein. This acid is an important polysaccharide which is contained in seaweeds, particularly in phaephyta. Algin is the generic name of various salts of alginic acid and the sodium salt, ammonium salt and propyleneglycohol ester of alginic acid are of particular commercial significance.

Although algin has a variety of applications, because of its excellent emulsifying, stabilizing and water-absorbing actions, such as gelling agent, water-soluble ointment, lubricant, paper-sizing agent, finishing agent for leather or fabrics, and even pasting agent and childbirth-assisting agent, it is extremely troublesome to handle because of its high viscosity (1000 centipoises in 1% solution, 8000 centipoises in 2% solution). The conventional method for recovering algin from seaweeds is thus disadvantageous in that it comprises complicated processing steps and requires a long time thus resulting in high cost which has prevented the wide usage of said method.

The following is an example of a complicated method conventionally practised.

Seaweed such as Laminaria, after being washed with water, is treated for several hours, for example, with 0.05N sulfuric acid to induce swelling, and then is treated with caustic soda or soda ash followed by stirring of the mixture for over 5 hours at a pH of approx. 9.5. The solution thus obtained is highly viscous, and is diluted with water for lowering the viscosity to prepare a dilute solution of algin, for example, of 0.85 g/1. (The dilution step is indispensable in the conventional method.) A filtration step follows. However, the solution is difficult to filter per se. Filtration is carried out after the insoluble residue composed of such as the outer skins of the seaweed is removed from the solution with wire-netting using a filtration-assisting agent such as diatomaceous earth. The fltrate is thereafter neutralized with sulfuric acid to produce alginic acid, which is taken up by flotation method for preparing a solution, for example, of 2%. The solution is further neutralized with alkali, the resulting gel being decolorized and dehydrated over a long period of time. The final product is obtained by repeating these steps several times.

As explained above, the conventional method for recovering algin from seaweed is disadvantageous since it requires a number of troublesome steps due to the high viscosity of alginic acid and its salts, and particularly requires a step for removing impurities such as the outer skins from the seaweed or a step for decolorizing the highly viscous extract product of the seaweed. An attempt to avoid the high viscosity by heating fails since it causes considerable change in the chemical structure of the compounds. For example, heat treatment for an hour at 95° C gives rise to 37% lowering in viscosity, and that for an hour even at 80° C give rise to 8% lowering in viscocity, indicating substantial change in chemical structure.

SUMMARY OF THE INVENTION

Accordingly, it is an object of the present invention to provide a method for concisely and cheaply praparing edible seaweed powder and algin.

The present invention is based on the finding that the addition of hydrogen peroxide or a hydrogen peroxide compound (a compound which may be decomposed to produce hydrogen peroxide), per se or in a suitable solution, into protoplasmic aqueous solution of seaweed (regardless of whether alkaline, neutral or acidic) will accelerate the stripping-off of the outer skin of the seaweed because of permeability through the skin of the seaweed by hydrogen peroxide and the action of enzymes such as catalase presently mainly in the middle of the exodermis layer and the endodermis layer.

The present invention thus provides a method for preparing seaweed powder which comprises adding hydrogen peroxide or a hydrogen peroxide compound to seaweed to strip off the outer skin of the seaweed and then drying the seaweed which has been stripped of its outer skin.

The present invention further provides a method for preparing algin which comprises adding hydrogen peroxide or a hydrogen peroxide compound to strip off the outer skin of the seaweed, treating the seaweed which has been stripped of its outer skin with alkali to convert alginic acid contained in the seaweed into alkali alginate, and recovering the alkali alginate.

DETAILED DESCRIPTION OF THE INVENTION

According to the present invention, hydrogen peroxide or hydrogen peroxide compound is decomposed to produce atomic or molecular oxygen by the action of an enzyme such as catalase, said oxygen facilitating the stripping of the outer skin of the seaweed and at the same time bleaching the contents of the seaweed.

The seaweed thus can be efficiently converted, by a simple drying process, into extremely clean seaweed powder. In addition to its colorless cleaness, the seaweed powder obtained by the present invention is advantageous in that it has excellent digestibility since the stiff, indigestible outer skins have been stripped off. The seaweed powder obtained by the present invention further serves as an excellent sanitary food since it contains nutritive elements indispensable to the human body, such as iodine or bromine. The seaweed powder helps to maintain the human body in alkaline conditions. The seaweed powder of the present invention may thus be used simply as flour food or in combination with other food for enhancing nutrition. The seaweed powder may be utilized in preparing a stock by adding it to water.

According to the present invention, as the oxygen produced from hydrogen peroxide or hydrogen peroxide compound will facilitate the stripping-off of the skins of seaweed, algin can be prepared by an extremely simplified process, not requiring such complicated steps as in the conventional method described above. Particularly, the present invention is of advantage in that because of the bleaching function of the active (atomic) oxygen produced from hydrogen peroxide or hydrogen peroxide compound, no decolorizing or bleaching step is needed. This is in contrast with the conventional method which includes an indispensable decolorizing or oxidizing bleaching step with such agents as active carbon or other oxidizing agents.

The method of the present invention can be applied to all sorts of seaweeds (phaeophyceae or brown algae, chlorophyceae or green algae, and rhodophyceae or red algae), being particularly suitable for application to Laminaria japania ARESCHOUG, giant Kelp macrocystis pyrifera, Sargassum horneri C. AGAROH, Sargassum micracanthum YENDO and Undaria pinnatifida SURINGAR.

In the practice of the present invention where hydrogen peroxide or hydrogen peroxide compound is added to seaweed which has been pretreated in a suitable manner, the hydrogen peroxide per se or hydrogen peroxide produced from the hydrogen peroxide compound will penetrate through the outer skin of the seaweed or, when the seaweed is cut into sections, between the outer and inner skins of the seaweed into the inner parts of the seaweed and is there decomposed to produce molecular or atomic oxygen due to the function of an enzyme such as catalase, which is present mainly between the inner skin and outer skin of the seaweed. The oxygen gas expands or loosens the outer skin to strip the same off the seaweed, while preventing hydrogen peroxide, the hydrogen peroxide compound or oxygen from further penetrating into the inner parts of the seaweed.

The rate of stripping-off of the outer skin depends firstly on the permeability of the outer skin to hydrogen peroxide or the hydrogen peroxide compound and secondly on the looseness of the outer skin. The more easily the outer skin lets hydrogen peroxide and the hydrogen peroxide compound permeate therethrough and the looser is the outer skin, the more rapidly the swelling of the seaweed will proceed so as to cause the stripping-off of the outer skin thereof.

In stripping-off the outer skin of seaweed according to the present invention, the function of catalase or other enzyme present in the seaweed is influenced by various operational factors such as the concentration of hydrogen peroxide, pH of the treating liquid, temperature, reaction time, etc.

From the view point of operational ease and time required, hydrogen peroxide or hydrogen peroxide compound is preferably added to the seaweed in an amount ranging from 3 – 20% calculated as an aqueous solution of hydrogen peroxide. When the concentration of the aqueous solution of hydrogen peroxide is lower than 1%, the operation time becomes so long as to be unsuitable for practical purposes. On the other hand, adding hydrogen peroxide or the hydrogen peroxide compound in an amount exceeding 20% of an aqueous solution of hydrogen peroxide does not give any significant additional effect.

The step of stripping off the outer skin of seaweed in the present invention is suitably carried out in the temperature range of from 30° to 80° C. A lower temperature, for example, 20° C, will render the reaction so slow as to be unsuitable for practical purposes. On the contrary, the employment of a higher temperature entails the disadvantage that the hydrogen peroxide or hydrogen peroxide compound undergoes excessive gasification which leads to troubles in operation and thus requires complex countermeasures. Operation at a temperature higher than 80° C is further undesirable since it cause a substantial change in the chemical structure of seaweed.

It should be further mentioned that the outer skin stripping process of the present invention can be carried out not only by simple addition of hydrogen peroxide or hydrogen peroxide compound (pH: neutral or weakly acidic) but also, if desired, by addition of a suitable alkali or acid in combination with the hydrogen peroxide or hydrogen peroxide compound.

For example, an acid such as sulfuric acid, hydrochloric acid, acetic acid or acetic anhydride may be added along with the hydrogen peroxide or hydrogen peroxide compound. In the low pH region caused by addition of such an acid, loss of algin by dissolution is advantageously lessened although the rate of decomposition of hydrogen peroxide and hence the rate of the stripping of the outside skin from the seaweed are retarded. However, for practical operation, the operation is preferably conducted at a pH value higher than 4 since an excessively low pH adversely retards the decomposition of hydrogen peroxide. In the case where an organic acid is added together with hydrogen peroxide, a peracid will form from the two compounds (for example, peracetic acid will be formed from acetic acid and hydrogen peroxide), and the peracid will then produce hydrogen peroxide in the aqueous solution.

In a case where the stripping-off of the outside skin of seaweed is carried out in an alkaline region by adding alkali such as sodium carbonate, ammonium carbonate or aqueous ammonia along with the hydrogen peroxide or hydrogen peroxide compound, the rate of decomposition of hydrogen peroxide is accelerated resulting in increased rate of the stripping-off of the outside skin. However, since excessive addition of alkali quickens the loss of alginic acid by dissolution and further necessitates troublesome subsequent steps, in practical operation the stripping-off process is preferably conducted in a pH range of less than 8.

It should be further added that the process for stripping-off the outside skin of seaweed may preferably be carried out together with ultraviolet or sunbeam irradiation, as the decomposition of the hydrogen peroxide or hydrogen peroxide compound due to the enzyme (catalase etc.) is activated and accelerated thereby.

According to the method of the present invention, the outer skin stripped off of the body of the seaweed floats up to the upper portion of the liquid with the oxygen bubbles while the body (meat) of the seaweed per se settles toward the bottom of the liquid, thus the floating outer skins can be easily removed from the system by overflow of water. The remaining hydrogen peroxide, acid and alkali are removed by continued washing with water. The body of the seaweed is dried and powdered into seaweed powder as desired. In addition the outer skin per se may be separately powdered for utilization for perfume since it has the so-called "scent of seaweeds".

In preparing algin from seaweed according to the method of the present invention, the body of the seaweed, the seaweed which has been stripped of its outer skin in the way described above is treated with an alkali, alkali metal salt or alkaline earth metal salt to extract alginic acid as algin therefrom. The most suitable alkali, alkali metal salt and alkaline earth metal salt for use in the alkali extraction of the present invention includes $Na_2CO_3$, $(NH_4)_2CO_3$, or $NH_4OH$. Other compounds such as NaOH, $Na_2SO_3$, $Na_3PO_4$, $Ca(OH)_2$, $CaCO_3$, etc. may also be used.

The following is an example of the alginic acid extraction step of the present invention: To 100 g of the white body of seaweed is added 2 - 3 liters of 1% $NH_4OH$ aqueous solution with stirring to obtain a viscous solution. The solution is then filtered with a filtering cloth. When dilute hydrochloric acid is added stepwise to the filtrate obtained, alginic acid is congealed into an agar-like product containing a large amount of water therein and which then floats up in the liquid. The floated product is then filtered and treated with a small amount of alcohol. To the resultant filter cake is added 1% $NH_4OH$ aqueous solution to form a colorless, transparent solution which is thereafter congealed with hydrochloric acid. The congealed product is then pressed to remove water contained therein. If necessary, the solid product obtained is treated with 96% ethanol and the mixture obtained is heated for a period of 2 - 3 hours, cooled and filtered. The filter residue is treated with 10 cc of 1% hydrochloric acid solution (prepared by adding 80% alcohol to hydrochloric acid), and heated at 80° C for 20 minutes for removing the remaining metal salts bound to alginic acid and obtaining the final product. The yield of alginic acid obtained in 32 grams. When it is desired to convert alginic acid into an alginate, another step follows wherein, for example, 1 gram of alginic acid is treated with about 56 cc of alkali, alkali metal salt or alkaline earth metal salt.

Without any troublesome pretreatment as required in the conventional methods, the present invention thus provides an extremely simplified method for preparing algin from seaweed since the extraction of alginic acid is conducted after the outer skin of the seaweed is stripped off by the hydrogen peroxide.

To further illustrate the present invention, but not to limit the same, the following examples are given.

EXAMPLE 1

To 2.50 g of dried Laminaria were added 10 times by volume of water and 10 cc of acetic acid. The mixture thus obtained was treated with stirring with 4.8 g of a 35% $H_2O_2$ aqueous solution resulting in a 5.6% $H_2O_2$ aqueous solution. The reaction was carried out at 30° C under a pH 5.3. After 5 minutes from the initiation of the stirring, a violent evolution of bubbles was observed, indicating the initiation of the reaction by the decomposition of $H_2O_2$ by the action of the enzyme (catalase etc.).

The violent evolution of bubbles continued with further stirring, and eventually the stripping-off of the outer skin of the seaweed occurred. The meat of the seaweed was white and transparent, while the stripped-off outer skin retained its original color (brownish dark blue). The operation was maintained for 2 hours and then the stripped-off outer skin was removed by overflow of water. The body (meat) of the seaweed was sufficiently washed with water and dried to obtain 2.488 g of dried seaweed powder.

EXAMPLE 2

To 2.572 g of dried Undaria pinnatifida (wakame seaweed) were added 10 times by volume of water and 10 cc of aqueous ammonia. The mixture thus obtained was treated with 4.2 g of a 35% $H_2O_2$ aqueous solution to obtain a 5% $H_2O_2$ aqueous solution. The reaction was carried out at 30° C at pH 8, in the same manner as in Example 1, resulting in the stripping-off of the outer skin of the seaweed. The meat of the seaweed was white, while the stripped-off outer skin retained its original color. After the operation was maintained for 2 hours, the stripped-off outer skin was removed by overflow of water. The meat of the seaweed was washed with water and dried to obtain 2.571 g of dried seaweed powder.

EXAMPLE 3

To 4.339 g of dried Sargassum micracanthum C. AGAROH were added 10 times by volume of water and 13 cc of a 35% $H_2O_2$ aqueous solution resulting in an 8% $H_2O_2$ aqueous solution of neutral pH. The reaction was carried out at 30° C in the same manner as in the Examples above. After 4 hours when the evolution terminated, the outer skin was removed while the meat was washed with water and dried to obtain 4.308 g of dried white seaweed powder.

EXAMPLE 4

To 4.541 g of dried Sargassum horneri C. AGAROH was added ten times by volume of water and 4 g of $Na_2CO_3$. The mixture thus obtained was treated with 32.5 g of a 35% $H_2O_2$ aqueous solution resulting in a 14.6% $H_2O_2$ aqueous solution. As the reaction was conducted at 35° C under pH 8 and further under ultraviolet ray irradiation, violent evolution of bubbles was observed as in the examples above and eventually the seaweed was stripped of its outer skin. The meat of the seaweed was found to be white. After 4 hours from the initiation of the reaction, the stripped outer skin was removed and the meat of the seaweed was washed with water and dried to obtain 4.533 g of white dried seaweed powder.

EXAMPLE 5

100 g of dried Vlopteryx pinnatifida was sufficiently washed with water, treated with 0.5% hydrochloric acid, allowed to stand at room temperature for a period of 2 hours, and then washed again with water to remove the hydrochloric acid.

To the mixture thus obtained was added the hydrogen peroxide compound $CH_3C(=O)OOH$, which had been prepared by the reaction of hydrogen peroxide with glacial acetic acid in a conventional manner. The addition was stepwise in the solid state or as a dilute aqueous solution (e.g. 10% aqueous solution) so that the resulting concentration of hydrogen peroxide was 5% to the total of the mixture and the pH was adjusted to 5.

On initiating the stirring of the mixture after completion of the addition of the hydrogen peroxide compound, the decomposition of peracetic acid started to produce hydrogen peroxide as expressed by the following equation:

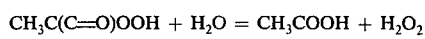

Hydrogen peroxide was decomposed by the action of catalase or other enzyme to evolve bubbles caused thereby. In about 4 hours from the initiation of the evolution of bubbles, the seaweed was completely stripped of its outer skin to yield white meat of seaweed, while the stripped skin floated up in the liquid. After stirring the mixture for another 2 hours, the stripped outer skin was removed by overflow of water along with the remaining hydrogen peroxide, acid and salt.

The white meat of the seaweed (the seaweed which had been stripped of its outer skin) thus prepared was dried to obtain 98 g of the white seaweed powder.

EXAMPLE 6

The operation as in Example 5 was repeated except that a solid hydrogen peroxide compound which had been prepared by the reaction of $H_2O_2$ with lime was added, per se or in an aqueous solution, along with addition of a suitable mineral acid, organic acid, $NaHCO_3$, $Na_2CO_3$, $NH_4OH$, $(NH_4)_2CO_3$ or $NH_4HCO_3$, to the seaweed in place of the compound $CH_3C(=O)OOH$ to obtain seaweed powder.

EXAMPLE 7

100 g of dried Ulopteryx pinnatifida was sufficiently washed with water, treated with 0.5% hydrochloric acid, allowed to stand at room temperature for a period of 2 hours, and then washed again with water to remove the hydrochloric acid.

To the mixture thus obtained was added the hydrogen peroxide compound $CH_3C(=O)OOH$, which had been prepared by the reaction of hydrogen peroxide with glacial acetic acid in a conventional manner. The addition was stepwise in the solid state or as a dilute aqueous solution (e.g. 10% aqueous solution) so that the resulting concentration of hydrogen peroxide was 5% to the total of the mixture and the pH was adjusted to be 5.

On initiating the stirring of the mixture after completion of the addition of the hydrogen peroxide compound, the decomposition of peracetic acid started to produce hydrogen peroxide as expressed by the following equation:

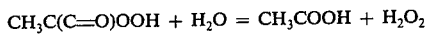

$$CH_3C(=O)OOH + H_2O = CH_3COOH + H_2O_2$$

Hydrogen peroxide was decomposed by the action of catalase or other enzyme to evolve bubbles caused thereby. In about 4 hours from the initiation of the evolution of bubbles, the seaweed was completely stripped of its outer skin to yield white meat of seaweed, while the stripped skin floated up in the liquid. After stirring the mixture for another 2 hours, the stripped outer skin was removed by overflow of water along with the remaining hydrogen peroxide, acid and salt.

The white meat of the seaweed, that is, the seaweed which had been stripped of its outer skin in the manner above, was immersed in about 100 cc of water. To the mixture was added 2 liters of 1% aqueous ammonia solution. The aqueous solution of ammonium alginate thus obtained was then filtered and pressdehydrated. To the resulting filter residue was added 50 cc of 96% alcohol and the mixture thus obtained was heated for about 1 hour. The mixture was filtered and dried over sulfuric acid in vacuo to obtain about 38 g of alginic acid. The aqueous solution of said alginic acid is acidic (pH is 3.0 at 28° C), does not reduce Fehling's solution, produces furfural and carbonic acid when boiled with 12% HCl and exhibits a clear naphthoresorcinol reaction. The specific rotary power of the alginic acid was $[\alpha]_D^{22} = -(3).5$

EXAMPLE 8

100 g of dried Laminaria Japonica was sampled, sufficiently washed with water to remove sand and salt attached thereto, and treated with 0.5% HCl. The mixture obtained was allowed to stand at room temperature to cause sufficient swelling, and was then washed with water to remove the acid component. The mixture was treated with about 300 cc of 10% aqueous ammonia to adjust its pH to 9 and further treated with 225 cc of 35% $H_2O_2$ aqueous solution to make the $H_2O_2$ concentration in the liquid 15%.

On initiating bubbling, mild stirring of the liquid mixture was started and continued for about 4 hours. The mixture was then allowed to stand for 2 hours, and freed of the outer skin which had been stripped off and of the exessive $H_2O_2$ remaining. When the meat of the seaweed thus obtained was treated with 10% $Na_2CO_3$ to adjust the pH to 8 and the mixture was stirred, the white meat of the seaweed was dissolved to produce a transparent, viscous solution.

The solution was treated with 1% HCl (in 80% alcohol solution) and heated at 80° C for 30 minutes for removing the remaining salts bonded with the alginic acid. (In this stage, the alginic acid is too resistant to acid to be subjected to hydrolysis and does not reduce Fehling's solution.)

The alginic acid thus obtained, after being filtered and pressed, was heated twice in 80% alcohol and once in 96% alcohol, each heating being continued for 1 hour. The alginic acid was thereafter dried in a desiccator. The yield of the alginic acid was 37g.

EXAMPLE 9

The hydrogen peroxide compound in Example 8 was replaced with the compound $Na_2CO_3 \cdot 1.5H_2O_2$ or the compound $K_2CO_3 \cdot 2H_2O_2 \cdot 1/2H_2O$. (These compounds were prepared by reacting 1 mole of hydrogen peroxide with 1 mole of potassium carbonate or sodium carbonate at low temperature. The compounds are chemically stable in the dried state but are decomposed to produce $H_2O_2$ gradually in neutral aqueous solution and rapidly in acidic aqueous solution.)

The same operation was followed as in Example 8 to obtain 2 g of alginic acid.

What is claimed is:

1. A method for preparing seaweed powder from seaweed which comprises treating the seaweed with hydrogen peroxide in aqueous solution in an amount sufficient to strip off the outer skin of the seaweed and then drying the seaweed which has been stripped of its outer skin.

2. The method of claim 1 wherein the concentration of hydrogen peroxide is from 1% to 20%.

3. The method of claim 1 wherein the pH of the aqueous solution is higher than 4 and less than 8.

4. The method of claim 1 wherein the treatment with hydrogen peroxide is carried out at a temperature of 30 to 80° C.

5. The method of claim 1 wherein the hydrogen peroxide is formed by decomposition of a hydrogen peroxide is formed by decomposition of a hydrogen peroxide compound in aqueous solution.

6. The method of claim 1 wherein an acid is added to the aqueous solution.

7. The method of claim 1 wherein a base is added to the aqueous solution.

8. The method of claim 1 wherein the treatment with hydrogen peroxide is carried out in the presence of ultraviolet irradiation.

9. The method of claim 1 wherein the concentration of hydrogen peroxide is from 1% to 20%, the pH of the aqueous solution is higher than 4 and less than 8 and the treatment with hydrogen peroxide is carried out at a temperature of 30° to 80° C.

10. A method for preparing algin from seaweed which comprises treating the seaweed with hydrogen peroxide in aqueous solution in an amount sufficient to strip off the outer skin of the seaweed, drying the seaweed which has been stripped of its outer skin, and treating the dried, stripped seaweed with an alkaline reagent to extract alginic acid as algin therefrom.

11. The method of claim 10 wherein the pH of the aqueous solution of hydrogen peroxide is higher than 4 and less than 8 and the alkaline reagent is selected from the group consisting of an alkali, an alkali metal salt and an alkaline earth metal salt.

12. The method of claim 11 wherein the hydrogen peroxide concentration is from 1% to 20% and the treatment with hydrogen peroxide is carried out at a temperature of 30° to 80° C.

* * * * *